Patented Sept. 27, 1932

1,879,535

UNITED STATES PATENT OFFICE

ROBERT E. SCHMIDT, BERTHOLD STEIN, AND KURT BAMBERGER, OF ELBERFELD, GERMANY, ASSIGNORS TO GENERAL ANILINE WORKS INC., OF NEW YORK, N. Y., A CORPORATION OF DELAWARE

NEW VAT DYESTUFFS OF THE ANTHRAQUINONE SERIES

No Drawing. Application filed March 26, 1929, Serial No. 350,128, and in Germany April 7, 1928.

The present invention relates to new vat dyestuffs of the anthraquinone series and to a process of preparing same.

We have found that new vat dyestuffs of the anthraquinone series are obtainable by transforming a 2-amino-3-halogen-anthraquinone, the nucleus of which may be further substituted by monovalent substituents, for instance, by halogen, the hydroxy-, amino-, alkoxy-group and the like into the corresponding 2-amino-3-cyano-anthraquinone according to known methods and reacting upon the compounds thus obtainable with copper or a copper salt in the presence of a liquid tertiary cyclic base, such as quinoline, pyridine, quinaldine and the like, at elevated temperatures.

The reaction may be performed, for instance, as follows: The 2-amino-3-halogen anthraquinone compound is transformed into the corresponding 3-cyano compound by heating with cuprous cyanide in quinaldine or according to any desired other method and the cyano compound is then dissolved or suspended in a tertiary cyclic base, copper or a copper salt, such as cuprous bromide, -chloride, -cyanide, copper-chloride, copper acetate and the like is added in a rather small amount, say about 0.1 to 5%, and the mixture is heated to temperatures between about 150–250° C., if necessary with the application of super-atmospheric pressure. The time after which the reaction is complete, varies in the widest limits, mainly depending upon the temperatures and the solvent used, about ¼–5 hours being mentioned by way of example. The vat dyestuffs, being formed, separate during the reaction and can be isolated in any desired manner, for instance, by filtering and removing the organic solvent as well as the copper or the copper-salt used according to the usual methods. Obviously it will not be necessary to isolate the 2-amino-3-cyano compound, but it will be possible to combine the formation of the latter with its transformation into the vat dyestuff, for instance, by treating the 2-amino-3-halogen anthraquinone compound with cuprous cyanide in a tertiary cyclic base, until the cyano compound has formed and further working as described above.

The compounds thus obtainable form yellow to violet crystals, nearly insoluble in the usual organic solvents, soluble in strong sulfuric acid with yellow to red colorations, dyeing cotton from an alkaline hydrosulfite vat yellow to violet shades of good fastness properties. We do not know the exact structure of the new compounds but believe them to be polymers of the starting materials, polymerization probably having taken place at the cyano groups.

The following examples illustrate our invention without limiting it thereto, the parts being by weight:

*Example 1.*—1,5 parts of 2-amino-3-cyano anthraquinone are dissolved in 7,5 parts of quinoline and to this solution 0,04 parts of cuprous cyanide are added, while heating to about 200–220° C. After a short time orange yellow needles separate, which are sucked off while hot, and washed with alcohol. 1,3–1,4 parts of orange yellow crystals are thus obtained, being nearly insoluble in the usual organic solvents, soluble in strong sulfuric acid with a yellow coloration. The new compound yields a yellowish-brown hydrosulfite vat from which cotton is dyed clear orange yellow shades.

*Example 2.*—10 parts of bromo-2-amino-3-cyano anthraquinone (obtained by brominating 2-amino-3-cyano anthraquinone in nitrobenzene soluton) are heated to boiling in 50 parts of quinoline with the addition of 30 parts of cuprous bromide until no more yellow needles separate. The mixture is sucked off while hot, the residue washed with alcohol and dried. A brownish-yellow crystal powder is thus obtained, dissolving in strong sulfuric acid with a yellow coloration. The new compound yields a yellowish-brown hydrosulfite vat from which cotton is dyed yellow shades.

*Example 3.*—15 parts of 2-amino-3-cyano anthraquinone are heated in 75 parts of pyridine with the addition of 4 parts of cuprous cyanide to about 200–220° C. for about 6 hours with the application of superatmospheric pressure. After cooling, the reaction mixture is worked up as described in Example 1. The product thus obtainable is identical with that of Example 1.

*Example 4.*—30 parts of 2-amino-3-bromo anthraquinone are boiled in 150 parts of quinoline with the addition of 10 parts of cuprous cyanide, until the separation of the brownish-orange needles being formed is complete. The reaction mixture is then sucked off while hot and the residue is washed with alcohol. Any copper compound being present may be removed by boiling with an aqueous alkali metal cyanide solution. The product thus obtainable is identical with that described in Example 1.

*Example 5.*—5 parts of 1,2-diamino-3-bromo anthraquinone are boiled in 25 parts of quinoline in the presence of 2.8 parts of cuprous cyanide. After a short time, dark brown crystals separate. As soon as the separation of the latter is complete, the reaction mixture is cooled to 100° C., sucked off and washed with pyridine and alcohol. After the removal of any copper compound being present as described above, a bromine-free product is obtained, dissolving in strong sulfuric acid with a yellow brown coloration, which changes to bluish-green after the addition of formaldehyde. The new compound dyes cotton from a light brown hydrosulfite vat strong chocolate brown shades of good fastness properties.

*Example 6.*—To a boiling solution of 5 parts of 1.3-dibromo-2-amino-anthraquinone in 25 parts of quinoline, 2,5 parts of cuprous cyanide are added, whereby a violent reaction occurs. After some minutes separation of lancet-like needles begins. As soon as their separation is finished the reaction mixture is worked up as described in Example 4. The product thus obtainable is nearly insoluble in the usual organic solvents, soluble in concentrated sulfuric acid with an orange-brown coloration and dyes cotton from a brownish-yellow hydrosulfite vat yellow shades.

*Example 7.*—78 parts of 1-phenylamino-2-amino-3-bromo anthraquinone are dissolved in 400 parts of quinoline and the mixture is boiled after the addition of 20 parts of cuprous cyanide, while stirring, and under a reflux condenser until no more crystals separate, which latter are then sucked off, washed with pyridine and alcohol and dried. Beautiful copper-like glittering leaflets are thus obtained, dissolving in strong sulfuric acid with a red coloration. The new compound yields a brown hydrosulfite vat, from which cotton is dyed a reddish-brown shade.

We claim:

1. Process which comprises reacting upon 2-amino-3-cyano anthraquinone, the nucleus of which may be further substituted by halogen atoms, amino-hydroxy- or alkoxy groups, with a compound of the group consisting of copper and copper salts in the presence of a liquid tertiary cyclic base and at a temperature between about 150–250° C.

2. Process which comprises reacting upon 2-amino-3-cyano anthraquinone, the nucleus of which may be further substituted by halogen atoms, amino-hydroxy- or alkoxy groups, with a cuprous salt in the presence of a liquid tertiary cyclic base and at a temperature between about 150–250° C.

3. Process which comprises reacting upon 2-amino-3-cyano anthraquinone, the nucleus of which may be further substituted by halogen atoms, amino-hydroxy- or alkoxy groups, with about 0.1–5% of a compound of the group consisting of copper and copper salts in the presence of a liquid tertiary cyclic base and at a temperature between about 150–250° C.

4. Process which comprises reacting upon 2-amino-3-cyano anthraquinone, the nucleus of which may be further substituted by halogen atoms, amino-hydroxy- or alkoxy groups, with 0.1–5% of a cuprous salt in the presence of a liquid tertiary cyclic base and at a temperature between about 150–250° C.

5. Process which comprises reacting upon 2-amino-3-cyano anthraquinone, the nucleus of which may be further substituted by halogen atoms, amino-hydroxy- or alkoxy groups, with a cuprous salt in the presence of quinoline, and at a temperature between about 150–250° C.

6. Process which comprises reacting upon 2-amino-3-cyano anthraquinone, the nucleus of which may be further substituted by halogen atoms, amino-hydroxy- or alkoxy groups, with about 0.1–5% of a compound of the group consisting of copper and copper salts in the presence of quinoline, and at a temperature between about 150–250° C.

7. Process which comprises reacting upon 2-amino-3-cyano anthraquinone, the nucleus of which may be further substituted by halogen atoms, amino-hydroxy- or alkoxy groups, with 0.1–5% of a cuprous salt in the presence of quinoline, and at a temperature between about 150–250° C.

8. Process which comprises reacting upon 2-amino-3-cyano anthraquinone in quinoline with a small amount of cuprous cyanide and at a temperature of about 200–220° C.

9. As new products the compounds being obtainable according to the process claimed in claim 1, said products probably being polymers of the starting materials, polymerization probably having taken place at the cyano group; forming yellow to violet crystals nearly insoluble in the usual organic solvents, soluble in strong sulfuric acid with yellow to red colorations, dyeing cotton from an alkaline hydrosulfite vat yellow to violet shades of good fastness properties.

10. The product being obtainable according to the process claimed in claim 8, said product probably being polymers of the starting materials, polymerization probably having taken place at the cyano group; forming orange yellow crystals nearly insoluble in the usual organic solvents, soluble in strong sulfuric acid with a yellow coloration, dyeing cotton from an alkaline hydrosulfite vat clear orange yellow shades.

11. A process which comprises reacting upon 2-amino-3-cyanoanthraquinone, the nucleus of which may be further substituted by halogen atoms, amino-, hydroxy- or alkoxy groups with a cuprous salt in the presence of quinaldine, and at a temperature between about 150–250° C.

12. A process which comprises reacting upon 2-amino-3-cyanoanthraquinone, the nucleus of which may be further substituted by halogen atoms, amino-, hydroxy- or alkoxy groups with about 0.1–5% of a compound of the group consisting of copper and copper salts in the presence of quinaldine, and at a temperature between about 150–250° C.

13. A process which comprises reacting upon 2-amino-3-cyanoanthraquinone, the nucleus of which may be further substituted by halogen atoms, amino-, hydroxy- or alkoxy groups with 0.1–5% of a cuprous salt in the presence of quinaldine, and at a temperature between about 150–250° C.

14. A process which comprises reacting upon 2-amino-3-cyanoanthraquinone in quinaldine with a small amount of cuprous cyanide, and at a temperature of about 200–220° C.

15. A process which comprises reacting upon 2-amino-3-cyanoanthraquinone, the nucleus of which may be further substituted by halogen atoms, amino-, hydroxy- or alkoxy groups with a cuprous salt in the presence of pyridine, and at a temperature between about 150–250° C.

16. A process which comprises reacting upon 2-amino-3-cyanoanthraquinone, the nucleus of which may be further substituted by halogen atoms, amino-, hydroxy- or alkoxy groups with about 0.1–5% of a compound of the group consisting of copper and copper salts in the presence of pyridine, and at a temperature between about 150–250° C.

17. A process which comprises reacting upon 2-amino-3-cyanoanthraquinone, the nucleus of which may be further substituted by halogen atoms, amino-, hydroxy- or alkoxy groups with 1–5% of a cuprous salt in the presence of pyridine, and at a temperature between about 150–250° C.

18. A process which comprises reacting upon 2-amino-3-cyanoanthraquinone in pyridine with a small amount of cuprous cyanide, and at a temperature of about 200–220° C.

In testimony whereof we have hereunto set our hands.

ROBERT E. SCHMIDT. [L. S.]
BERTHOLD STEIN. [L. S.]
KURT BAMBERGER. [L. S.]